United States Patent

[11] 3,548,889

[72] Inventor Kanichi Suzuki
 Tokyo, Japan
[21] Appl. No. 739,308
[22] Filed June 24, 1968
[45] Patented Dec. 22, 1970
[73] Assignee Kabushiki Kaisha Suzuki Kosakusho
 Tokyo, Japan,
 a corporation of Japan
[32] Priority Sept. 12, 1967
[33] Japan
[31] No. 42/58778

[54] APPARATUS FOR CONNECTING INSULATED WIRES
 5 Claims, 9 Drawing Figs.
[52] U.S. Cl. .................................................. 140/119,
 29/628

[51] Int. Cl. .................................................. B21f 15/04
[50] Field of Search ........................................ 29/628;
 140/111, 117, 118, 119, 149; 81/9.5

[56] References Cited
UNITED STATES PATENTS

| | | | |
|---|---|---|---|
| 2,949,939 | 8/1960 | Milla | 140/119 |
| 3,163,187 | 12/1964 | MacIntosh | 140/119 |
| 3,232,147 | 2/1966 | Kureth | 81/9.5 |

Primary Examiner—Lowell A. Larson
Attorney—George B. Oujevolk

ABSTRACT: A method and apparatus for connecting insulated wires capable of ensuring an electrical connection between the wires, wherein the ends of the insulated wires are arranged in parallel and twisted together in one direction, while the insulation is softened or burnt, until the excess portions of the connected wire ends are severed from the joint.

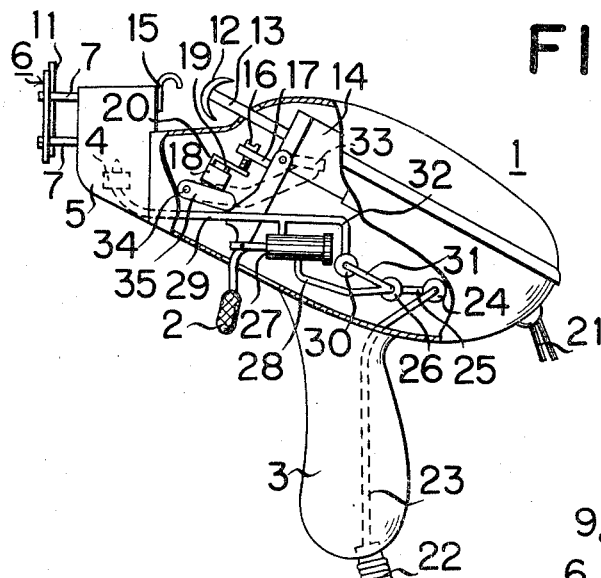
FIG. 1
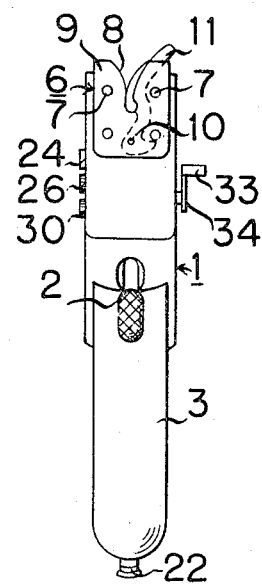
FIG. 2
FIG. 3
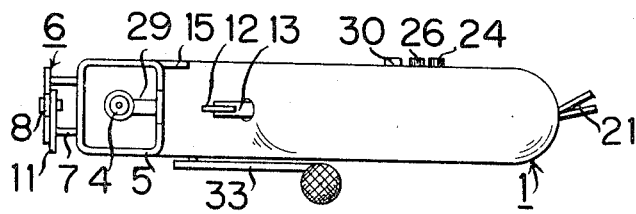
Kanichi Suzuki
INVENTOR.
BY George B. Oujevolk
Attorney Kanichi Suzuki
INVENTOR.

BY George B. Oujevolk
Attorney

PATENTED DEC 22 1970 3,548,889

INVENTOR.

BY

Attorney

APPARATUS FOR CONNECTING INSULATED WIRES

The present invention relates to a method for connecting insulated wires and also to an apparatus for carrying out the method.

There is considerable demand to connect the ends of two or more insulated wires. In effecting such connections, insulation on the wires is removed to establish electric connection between the conductors using, for example, a wire stripper. The wires thus stripped are twisted together, and excess portions of the wires are cut off, and if required, the twisted parts are soldered together. The most troublesome step of this known connecting operation is to remove the insulation and unfailingly to twist the ends of stripped wires. Where it is required to connect a large number of wires particularly as in the connection of telecommunication cables, most of the time required in connecting these cables is taken up by the aforementioned work on a large number of wires.

The present invention provides a method for connecting the insulated wires which comprises arranging the ends of a plurality of insulated wires in parallel, twisting the wire ends in one direction, heating at least a part of the twisted ends to a sufficient temperature to soften the wire insulation and carrying out further twisting so as to sever excess portions of the connected wire ends from the joint.

The present invention enables the ends of wires requiring connection to be contacted with each other by transversely penetrating the wire insulation due to twisting and consequently the joint of the wires to be kept insulated even after completion of connection. Thus the invention eliminates the necessity of stripping the insulation from the wire prior to connecting operation so as to uncover the wires, or after completion of connection, additionally applying insulating sleeves so as to ensure the insulation of the joint.

The present invention also provides an apparatus for carrying out the aforementioned connecting method. The apparatus comprises a first means for holding a plurality of insulated wires to be connected in a manner to prevent the portions of the wire ends requiring no connection from being twisted, a second means disposed after the first means to twist the wires between the first and second means and a heating means installed between the first and second means to heat at least a part of the twisted wires.

The heating means involved in the apparatus may be an electric heater arranged at a slight space from the twisted wires, or a burner so positioned as to apply flames at least to a part of the twisted wires.

FIG. 1 is a side elevation of a wire connecting apparatus according to the present invention with a part thereof broken away;

FIG. 2 is a front elevation of the apparatus illustrated in FIG. 1;

FIG. 3 is a horizontal plan of the apparatus illustrated in FIGS. 1 and 2;

Figure 4:
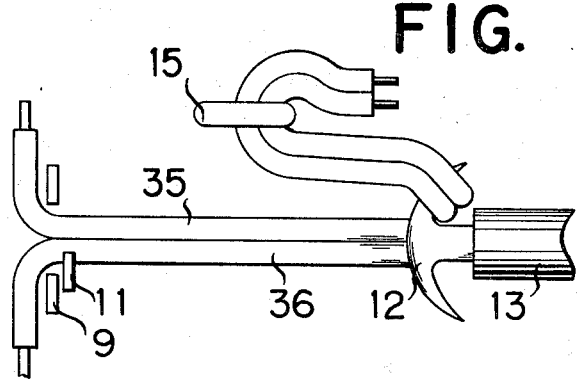
FIGS. 4 to 6 are plan views, partly cut away, showing the serial steps of connecting the ends of two insulated wires by the apparatus.

Referring now to FIGS. 1 to 3 showing an embodiment of the present invention, the apparatus for connecting the ends of insulated wires comprises a case 1, a trigger 2 extending outwardly of the case 1 and a handle 3 fixed to the case 1. In the case is provided a heating chamber 5 containing a burner nozzle 4. On one side of the heating chamber 5, there is supported by four pillars 7 at a slight space from said side a supporting means 6 to hold a plurality of insulated wires to be connected to prevent them from revolving. As best shown in FIG. 2, the supporting means includes an approximately rectangular plate member 9 having a cutaway portion 8 to receive wires and a holding lever 11 rotatably fitted to the plate member 9 by means of pin 10. The lever 11 is subjected to the action of an appropriate spring mechanism (not shown) so as to clamp the wires between said lever 11 and one sidewall of the cutaway area 8.

On that side of the upper part of the case which faces the supporting means 6 across heating chamber 5, there is fitted to a shaft 13 a rotary hook 12 for catching the ends of wires held by the supporting means so as to twist them, the shaft being connected to an electric motor 14. On the outer sidewall of the heating chamber 5 facing the rotary hook 12 there is fixed a bar 15 whose outermost end is bent in the U-shape. A plurality of insulated wires to be connected are supported by the supporting means 6 in parallel arrangement. The ends of the wires extending outwardly of the supporting means 6 pass over the heating chamber 5 and are caught by the rotary hook 12 and further by the U-shaped end of bar 15. The arm of the trigger 2 is fitted with a rod 17 having an adjusting screw 16 whose bottom end is contacted with a switching means 18, for example, a microswitch. The switching means 18 consists of a pin 19 to operate a pair of contacts to close or open to each other and a lever 20 contacted with the upper surface of the pin 19, said upper surface being further contacted with an adjusting screw 16. When the adjusting screw 16 is moved by the pulling of the trigger 2, the lever 20 is pressed by the bottom end of the adjusting screw 16 to connect the aforementioned pair of contacts by the aid of the pin 19. The terminal at one end of the switching means 18 is connected to the input terminal of the motor 14, and the terminal at the other end to one of a pair of lead wires 21 extending outwardly of the case 1. The other of the lead wires is connected to the remaining input terminal of the motor 14. Thus when the trigger 2 is pulled with a sufficient stroke to actuate the switching means 18, electric current is supplied from the lead wires 21 to the motor 14 for its operation.

In the interior of the case 1 is provided a fuel supply system to feed fuel gas to the turner nozzle 4 located in the heating chamber 5. The fuel supply line is connected by a pipe 23 to a connector member 22 positioned at the bottom end of the handle 3, said connector member being provided to be connected by a flexible pipe to a source fuel gas, for example, a cylinder of liquefied petroleum gas. The end of the pipe 23 opposite to the connector member 22 is connected to a valve 24 positioned on one side of the case 1. The valve 24 can release or stop the flow to burner nozzle 4 of fuel gas supplied through the pipe 23. The outlet of the valve 24 is connected through a pipe 25 to the inlet of a control valve 26. The outlet of the control valve 26 is branched into two portions, one of the branches being connected through a pipe 28 to the inlet of a valve 27 operable in interlocking relation with the trigger 2, and the other branch on the outlet side of control valve 26 being connected through a pipe 31 to the inlet of a valve 30 for regulating the pilot flame. The outlet of flow valve 27 is connected through a pipe 29 to the burner nozzle 4. The outlet of the pilot flame regulating valve 30 communicates through a pipe 32 with the pipe 29 connected to the outlet of the aforementioned valve 27. On one outer wall of the case 1 is positioned a hand-operable lever 33, which is fixed to a shaft 34 extending outwardly through the case 1. The shaft 34 can rotate trigger 2 by the aid of lever 35.

Prior to the connecting operation, the ends of the lead wires 21 are connected to an appropriate source of electric power, for example, a storage battery, and the connector member 22 located at the bottom end of the handle 3 is connected through a flexible tube to the feeder of a source of fuel gas such as a cylinder of liquefied petroleum gas. The valve 24 is opened to transfer to the control valve 26 the fuel gas carried through the pipe 23. The operation of the control valve 26 is so adjusted as to eject an adequate length of flame from the burner nozzle 4 when valve 27 is opened by pulling of the trigger 2. The pilot flame regulating valve 30 is so controlled as to keep the flames from the burner nozzle 4 at a minimum when the flow valve 27 is closed. This pilot flame regulating valve 30 acts as a source of fuel to supply large volumes thereof when the flow valve 27 is opened.

Upon completion of the aforementioned preparatory steps, a plurality of, for example, two insulated wires 35 and 36 requiring connection are arranged in parallel as shown in FIG. 4, and drawn into the connecting apparatus through the cutaway portion 8 provided in the plate member 9 of the supporting means 6. The ends of the wires are caught by the hook 12 and further by the U-shaped end of the bar 15. These insulated wires 35 and 36 are then set to be immovable in the cutaway portion 8 provided in the plate member 9 by means of press lever 11 subjected to the action of a spring means, and prevented from moving or turning round together.

Figure 5:
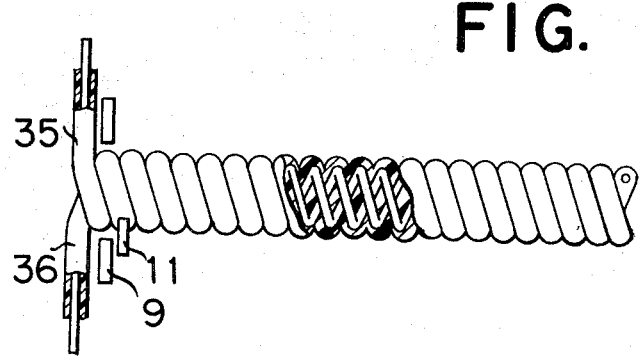
Figure 6:
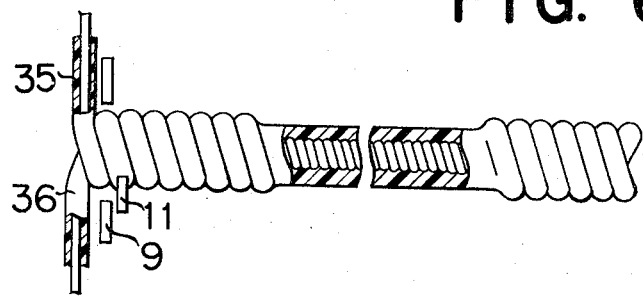

When the trigger 2 is pulled, or hand-operable lever 33 is pressed, contacts of switching means 18 are connected to each other, so that electric current is passed through the lead wires to the motor 14 for its operation. The drive of the motor 14 is transmitted through the shaft 13 to the rotary hook 12. Thus the insulated wires 35 and 36 are twisted together between the supporting means 6 and rotary hook 12 (see FIG. 5). Still under such conditions, the wires thus twisted remain separated from each other by the insulation with which they are covered. When the trigger 2 is sufficiently pulled to close switching means, the valve 27 is also actuated which operates interlockingly with the trigger 2, causing fuel gas to flow from the pipe 28 to the pipe 29. As a result, there are ejected sufficient volumes of flame to soften the wire insulation from the burner nozzle 4 where the pilot flame is kept at a minumum up to that time. Heating by flames from the burner nozzle 4 softens the insulation of the wires 35 and 36, causing them to be closely attached to each other where the insulation are softened. When the wires are subjected to further twisting in this state, there will be concentrated a twisting force on that part of the conductors which was heated to a maximum temperature, namely, in the area where the insulation were most softened, so that excess portions of the connected conductor ends are severed from the joint. Thus the conductors 35 and 36 are tightly contacted with each other at the ends from which the excess portions were cut off, and the surroundings of the joint still remain covered with coatings.

As described above, the apparatus of the present invention enables conductors insulated with thermoplastic synthetic resins, for example, polyvinyl chloride or polyethylene to be securely connected at the end. Furthermore, the apparatus wherein flames ejected from the burner nozzle are employed in heating wires is also capable of connecting wires insulated with paper insulation. In this case, while the wires are being twisted, paper insulation is burned by burner flames, causing the wires to be contacted with each other with good electrical contact. Upon application of further twisting, excess portions of the twisted wire ends are torn off. However, unlike plastic insulation paper insulation does not remain at the joint after application of burner flames. Therefore, if it is desired to keep the joint properly insulated, it will be necessary to apply appropriate insulating material to the joint after the wires are fully connected.

Figure 7:
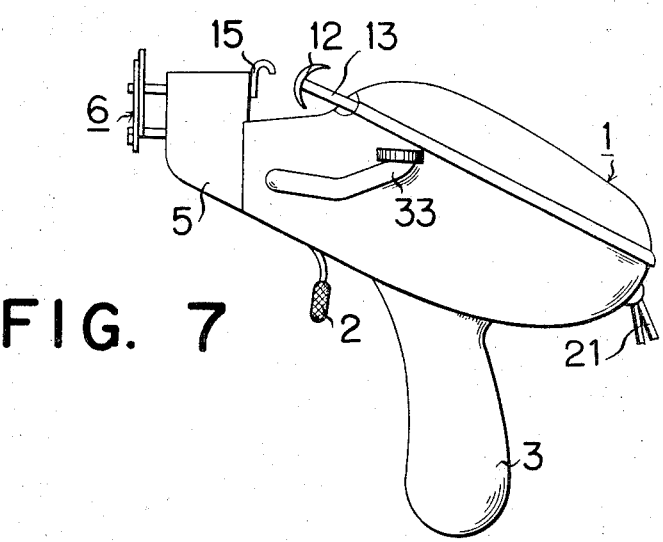
FIG. 7 is a side elevation of another embodiment of the apparatus according to this invention.
Figure 8:
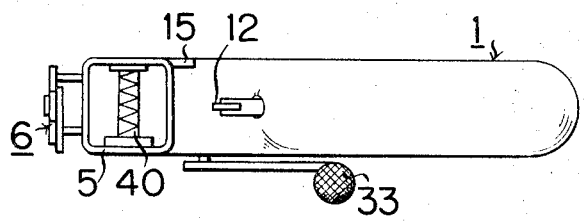
FIG. 8 is a horizontal plan of the apparatus illustrated in FIG. 7.
Figure 9:
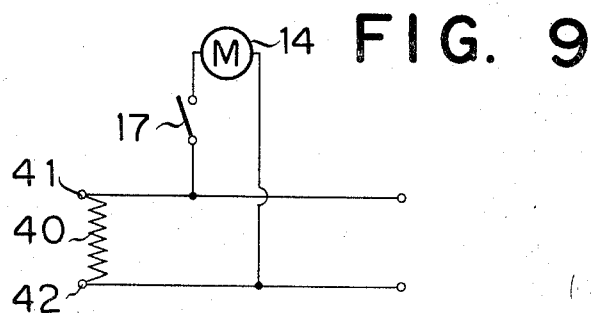
FIG. 9 is an electric circuit of the apparatus illustrated in FIG. 7.

FIGS. 7 and 8 illustrate another embodiment of a conductor-connecting apparatus according to the present invention. This apparatus is substantially the same as that shown in FIGS. 1 to 3 excepting that an electric heater replaces a burner as a heating means. In FIGS. 7 and 8, like parts are designated by like reference numerals and explanation thereof is omitted here. In the embodiment illustrated in FIGS. 7 and 8, the heating chamber 5 located in the case 1 contains an electric heater 40 comprising a coiled resistance wiring. As shown in FIG. 9 of a circuit, the heater 40 is connected to a pair of lead wires 21 by terminals 41 and 42, and when lead wires 21 are connected to a proper power source, releases sufficient amounts of heat to soften the insulation of the wires to be connected. The input terminal of the motor 14 for the rotary hook 12 is connected through the switching means 18 to a power source in parallel with the heater 40. As in the preceding embodiment, a plurality of conductors to be connected are caught by the U-shaped end of the bar 15 through the supporting means 6 and the hook 12. That part of the wire insulation which is positioned above the heating chamber 5 is softened by the heater 40. Therefore, when the rotary hook 12 is caused to turn round by the operation of trigger 2 or hand lever 33, the wires are contacted together by twisting while being still covered with the insulation, and excess portions of the wire ends are torn off the joint.

The present invention permits two separate preparatory steps indispensable to the prior art to be carried out at the same time with the connection of wires, so that time and work required in such connection are far more reduced than by the conventional method of connection. This is extremely important where a large number of wires are connected as is performed in the laying or replacement of telecommunication cables. Furthermore, where most common resin-insulated wires are connected, the present invention eliminates an insulating operation after their connection which has been a necessary step for the conventional method, and so enables such connection to be carried out with great ease.

While the invention has been described in connection with some preferred embodiments thereof, the invention is not limited thereto and includes any modifications and alterations which fall within the scope of the invention as defined in the appended claims.

I claim:

1. An apparatus for connecting insulated wires comprising a first means for supporting a plurality of insulated wires requiring connection in a manner to prevent the ends from being twisted, a second means disposed after the first means for twisting the wire ends and a heating means positioned between the first and second means for heating at least a part of the twisted wire ends.

2. An apparatus according to claim 1 wherein the second means consists of a hook for catching the wire ends and a motor for rotating the hook.

3. An apparatus according to claim 1 wherein the heating means is a burner so located as to eject flames onto the wire ends to be connected.

4. An apparatus according to claim 3 wherein the burner consists of a means for controlling the flow rate of fuel gas so as to limit the volumes of flame ejected from the burner, said controlling means comprising a first supply line provided with a flow valve and a second supply line provided with a control valve so as to supply only sufficient amounts of fuel gas to keep the burner flame at a minumum when the first supply line is closed.

5. An apparatus according to claim 1 wherein the heating means is an electric heater.